(12) United States Patent
Slattery et al.

(10) Patent No.: US 12,313,134 B2
(45) Date of Patent: May 27, 2025

(54) SYSTEM AND METHOD OF MAKING AN ENHANCED BRAKE ROTOR WITH IMPROVED CORROSION RESISTANCE

(71) Applicant: GM Global Technology Operations LLC, Detroit, MI (US)

(72) Inventors: Benjamin Everest Slattery, Tecumseh (CA); Kevin P. Callaghan, Bloomfield Hills, MI (US); Mark T. Riefe, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 17/721,654

(22) Filed: Apr. 15, 2022

(65) Prior Publication Data

US 2023/0332657 A1  Oct. 19, 2023

(51) Int. Cl.
*C23C 8/18* (2006.01)
*C23C 8/02* (2006.01)
*F16D 65/12* (2006.01)
*F16D 65/02* (2006.01)

(52) U.S. Cl.
CPC .............. *F16D 65/125* (2013.01); *C23C 8/02* (2013.01); *C23C 8/18* (2013.01); *F16D 65/127* (2013.01); *F16D 2065/132* (2013.01); *F16D 2200/0021* (2013.01); *F16D 2250/0046* (2013.01)

(58) Field of Classification Search
CPC ....... C23C 8/02; C23C 8/18; F16D 2065/132; F16D 2200/0021; F16D 2250/0046; F16D 65/125; F16D 65/137
See application file for complete search history.

(56) References Cited

U.S. PATENT DOCUMENTS 8,287,667 B2  10/2012  Holly et al.
9,621,105 B2   4/2017  Li et al.

FOREIGN PATENT DOCUMENTS

CN  103060822 A  *  4/2013  .............. C23F 17/00
CN  105331778 A    10/2017

* cited by examiner

*Primary Examiner* — Lois L Zheng
(74) *Attorney, Agent, or Firm* — Vivacqua Crane, PLLC

(57) ABSTRACT

Systems and methods of making an enhanced vehicular brake rotor having improved wear and corrosion resistance are provided. The enhanced vehicular brake rotor comprises a brake rotor comprising a base comprised of iron (Fe). The base comprises an outer surface having open pores formed thereon. The rotor has a steam-treated layer formed on the outer surface and in the open pores. The steam-treated layer is comprised of iron oxide ($Fe_3O_4$) and has a thickness of between 10 and 50 microns for enhanced wear and corrosion resistance to define the enhanced vehicular rotor.

8 Claims, 1 Drawing Sheet

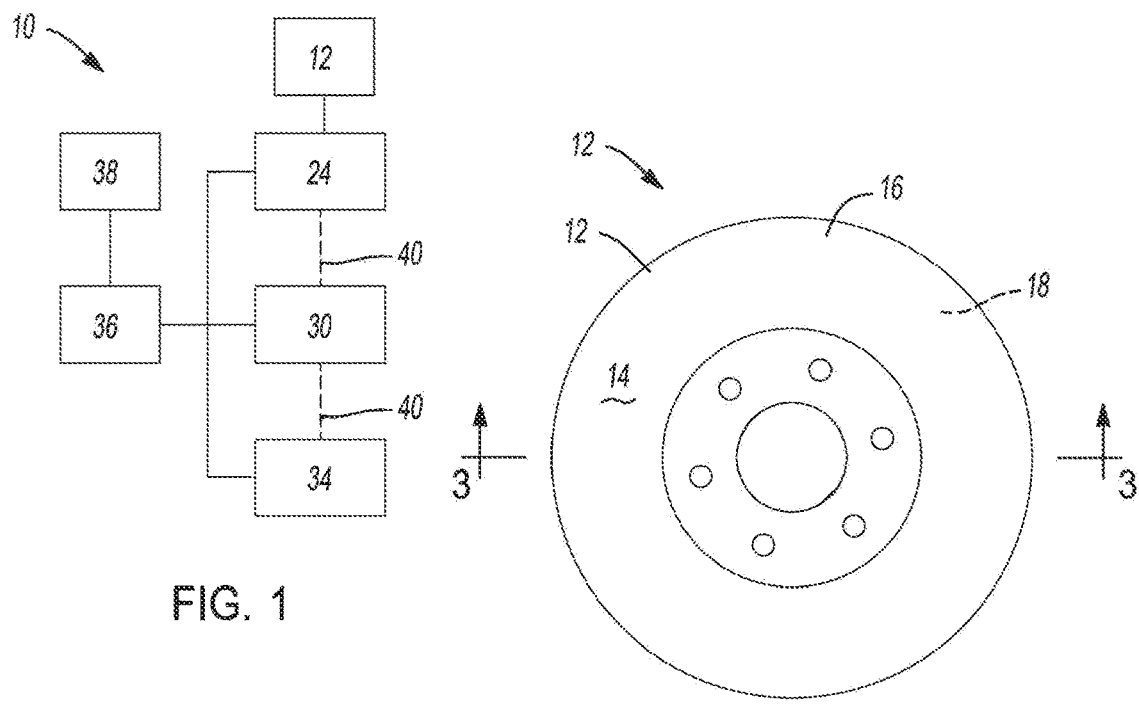
FIG. 1
FIG. 2
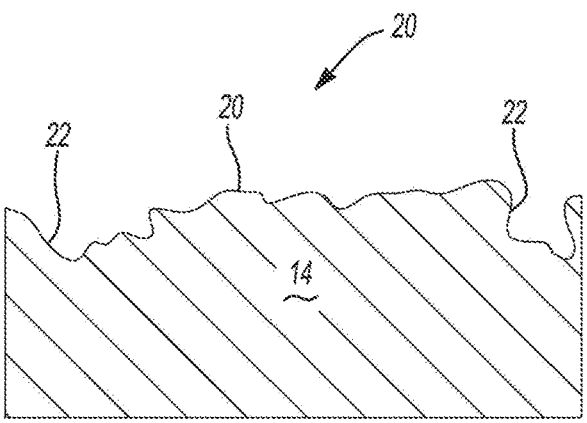
FIG. 3
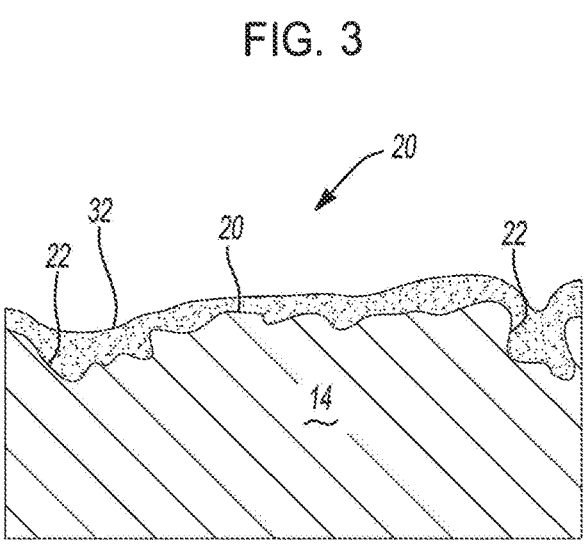
FIG. 4
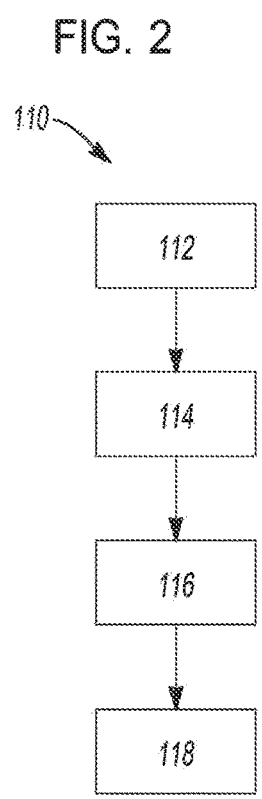
FIG. 5

SYSTEM AND METHOD OF MAKING AN ENHANCED BRAKE ROTOR WITH IMPROVED CORROSION RESISTANCE

INTRODUCTION

The present disclosure relates to brake rotors and, more particularly, systems and methods of manufacturing brake rotors with enhanced wear and corrosion resistance.

Brake rotors connect to wheels of a vehicle and are designed to turn motion (kinetic energy) into thermal energy (heat). Brake rotors provide a grip onto which respective brake pads latch when calipers apply pressure thereon. Brake rotor wear and corrosion have emerged as an important field within the automotive industry. In particular, brake rotor corrosion is a concern especially during transport of vehicles overseas.

SUMMARY

Thus, while current brake rotors achieve their intended purpose, there is a need for a new and improved system and method for manufacturing an enhanced brake rotor having improved wear and corrosion resistance.

In accordance with one aspect of the present disclosure, a system for making an enhanced vehicular brake rotor having improved wear and corrosion resistance is provided. The system comprises a vehicular brake rotor comprising a base comprised of iron (Fe). Moreover, the base may comprise an outer surface having open pores formed thereon. The system further comprises a cleaning unit arranged to clean the brake rotor to remove contamination thereon.

In this aspect, the system further comprises a steam furnace arranged to heat the brake rotor with steam to a temperature of between 600 degrees Fahrenheit (° F.) and 1000° F. for a time of between 0.5 hour (hr) and 3 hr to form a steam-treated layer on the outer surface and in the open pores. The steam-treated layer is comprised of iron oxide ($Fe_3O_4$) and may have a thickness of between 10 and 50 microns for enhanced wear and corrosion resistance.

Additionally, the system comprises a cooling unit arranged to cool the enhanced vehicular brake rotor to ambient temperature, defining the enhanced vehicular brake rotor. Moreover, the system comprises a controller in communication with the cleaning unit, the steam furnace, and the cooling unit. The controller is configured to control the cleaning unit, the steam furnace, and the cooling unit. Furthermore, the system comprises a power source configured to power the cleaning unit, the steam furnace, the cooling unit, and the controller.

In one embodiment, the temperature of the brake rotor is between 700° F. and 900° F. In another embodiment, the temperature of the brake rotor is 800° F. In yet another embodiment, the time to heat the brake rotor is between 1 hr and 2 hr. In still another embodiment, the time to heat the brake rotor is 1.5 hr.

In accordance with one embodiment, the thickness of the steam-treated layer is between 20 microns and 30 microns. In yet another embodiment, the thickness of the steam-treated layer is 25 microns.

In another embodiment, the cleaning unit is arranged to apply a solvent on the brake rotor to remove contamination therefrom and wherein is arranged to dry the brake rotor after applying solvent thereon. In still another embodiment, the system further comprises a robotic unit arranged to move the brake rotor to one of the cleaning unit, the steam furnace, and the cooling unit.

In accordance with another aspect of the present disclosure, an enhanced vehicular brake rotor having improved wear and corrosion resistance is provided. The enhanced vehicular brake rotor comprises a brake rotor comprising a base comprised of iron (Fe). The base may comprise an outer surface having open pores formed thereon. The brake rotor has a steam-treated layer formed on the outer surface and in the open pores. The steam-treated layer is comprised of iron oxide ($Fe_3O_4$) and has a thickness of between 10 and 50 microns for enhanced wear and corrosion resistance to define the enhanced vehicular brake rotor.

In one embodiment, the thickness of the steam-treated layer is between 20 microns and 30 microns. In another embodiment, the thickness of the steam-treated layer is 25 microns.

In accordance with another aspect of the present disclosure, a method of making an enhanced vehicular brake rotor having improved wear and corrosion resistance is disclosed. The method comprises providing a vehicular brake rotor comprising a base comprised of iron (Fe). The base comprises an outer surface having open pores formed thereon. The method further comprises cleaning the brake rotor to remove contamination therefrom.

Moreover, the method comprises heating the brake rotor with gaseous steam to a temperature of between 600 degrees Fahrenheit (° F.) and 1000° F. for between 0.5 hour (hr) and 3 hr to form a steam-treated layer on the outer surface and in the open pores, the steam-treated layer being comprised of iron oxide ($Fe_3O_4$) and having a thickness of between 10 and 50 microns for enhanced wear and corrosion resistance. Furthermore, the method comprises cooling the enhanced vehicular brake rotor to ambient temperature, defining the enhanced vehicular brake rotor.

In one example, the temperature of the brake rotor is between 700° F. and 900° F. In another example, the temperature of the brake rotor is 800° F. In yet another example, the time to heat the brake rotor is between 1 hr and 2 hr. In still another example, the time to heat the brake rotor is 1.5 hr.

In another example, the thickness of the steam-treated layer is between 20 microns and 30 microns. In yet another example, the thickness of the steam-treated layer is 25 microns. In still another example, the step of cleaning comprises applying a solvent on the brake rotor to remove contamination therefrom and drying the brake rotor after applying solvent thereon.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a schematic view of a system for making an enhanced vehicular brake rotor having improved wear and corrosion resistance in accordance with one embodiment of the present disclosure.

FIG. 2 is plan view of a vehicular brake rotor implemented by the system of FIG. 1.

FIG. 3 is a cross-sectional side view of the vehicular brake rotor of FIG. 2 taken along lines 3-3.

FIG. 4 is a cross-sectional side view of an enhanced vehicular brake rotor with a steam-treated layer implemented by the system of FIG. 1 for enhanced wear and corrosion resistance.

FIG. 5 is a flowchart of a method of making an enhanced vehicular rotor with the system of FIG. 1 in accordance with one example of the present disclosure.

DETAILED DESCRIPTION

The following description is merely exemplary in nature and is not intended to limit the present disclosure, application, or uses.

Aspects of the present disclosure provide systems and methods of manufacturing an enhanced vehicular brake rotor having improved wear and corrosion resistance. The systems and methods involve steam-heating (steam treatment) an outer surface of the brake rotor with gaseous steam Upon cooling, a steam-treated layer is formed on the outer surface and is comprised of iron oxide ($Fe_3O_4$) or magnetite. As a result, the outer surface has enhanced corrosion resistance, hardness, density and magnetic properties. Additionally, open pores on the outer surface are sealed for improved wear characteristic of the outer surface.

FIG. 1 shows a system 10 for making an enhanced vehicular brake rotor having improved wear and corrosion resistance in accordance with one embodiment of the present disclosure. As shown in FIGS. 1-3, the system 10 comprises a vehicular brake rotor 12. The brake rotor 12 comprises a base (or disc portion) 14 having a first side 16 and an opposing second side 18 (not shown) comprised of iron (Fe). A core 19 is coaxially rotatably attached to the base 14 for connection to a wheel hub (not shown). FIG. 3 depicts a magnification of the base 14 in microns. As shown, the base 14 comprises an outer surface 20 having open pores 22 formed thereon. As pores and porosity have been known to become local corrosion initiation sites, implementation of the systems and methods herein provide corrosion prevention and resistance.

As shown in FIG. 1, the system 10 further comprises a cleaning unit 24 arranged to clean the brake rotor 12 to remove contamination thereon. That is, the brake rotor 12 is cleaned such that contamination (oils, debris, residue) thereon is prevented or minimized. In one embodiment, the cleaning unit 24 is arranged to apply a solvent on the brake rotor 12 to remove contamination therefrom. It is to be understood that any suitable solvent may be used to clean the brake rotor such as a plasma or any solvent known in the art without departing from the spirit or scope of the present disclosure. The cleaning unit 24 is further arranged to dry the brake rotor 12 after applying solvent thereon. It is to be understood that any suitable drying method may be used without departing from the spirit or scope of the present disclosure.

Referring to FIG. 1, the system 10 further comprises a steam furnace 30 arranged to heat (by way of steam treatment) the brake rotor 12 with steam to a temperature of between 600 degrees Fahrenheit (° F.) and 1000° F. for a time of between 0.5 hour (hr) and 3 hr to form a steam-treated layer 32 (FIG. 4) comprising iron oxide on the outer surface 20 and in the open pores 22. In one embodiment, the brake rotor 12 may be heated to a temperature of between 700° F. and 900° F. in the steam furnace 30. More preferably, the brake rotor 12 may be heated to 800° F. Moreover, the time to heat the brake rotor 12 in the steam furnace 30 may be between 1 hr and 2 hr, preferably 1.5 hr.

Steam treatment, a thermal process, creates an iron oxide layer on the outer surface 20. Steam treatment provides the outer surface 20 with increased corrosion resistance, hardness, density and magnetic properties. Additionally, steam treatment can also be used to seal the open pores 22 of the outer surface 20 and improve wear characteristic of the outer surface 20. Steam treatment is preferably a batch process. As steam is introduced in the steam furnace 30, water vapor reacts with the iron of the outer surface 20 to form the steam-treated layer 32 comprised of iron oxide or magnetite ($Fe_3O_4$). After a designated period of time, the brake rotor 12 is removed from the unit and allowed to cool as discussed below.

In one embodiment for efficiency and throughput, a preferred steam treat process may utilize a continuous belt steam-treat furnace having temperature ranging between 600° F. and 700° F. Throughput may depend on the thickness of the iron oxide layer 32 as desired and may range from a time of 0.5 hr to 3 hr. It is to be understood that other suitable temperature and time ranges may be used without departing from the spirit or scope of the present disclosure.

As shown in FIG. 4, the steam-treated layer 32 is formed on the outer surface 20 and in the pores 22 to minimize moisture and hence corrosion. In this embodiment, the steam-treated layer 32 is comprised of iron oxide (e.g., $Fe_3O_4$) and preferably has a thickness of between 10 and 50 microns for enhanced wear and corrosion resistance. In accordance with other embodiments, the thickness of the steam-treated layer 32 may be between 20 microns and 30 microns, preferably 25 microns.

As shown in FIG. 1, the system 10 comprises a cooling unit 34 or cooling area arranged to cool the brake rotor 12 to ambient temperature, defining the enhanced vehicular brake rotor. It is to be understood that the cooling unit 34 may be any designated unit or area arranged to allow the brake rotor 12 to cool to ambient temperature. For example, the brake rotor 12 may manually or robotically be disposed in a cooling bin after steam treatment.

In one embodiment, the system 10 may comprise a robotic unit (not shown) arranged to move the brake rotor 12 to and from the cleaning unit 24, the steam furnace 30, and/or the cooling unit 34. The robotic unit may be any suitable robotic apparatus arranged to move the brake rotor 12 to and from the cleaning unit 24, the steam furnace 30, and/or the cooling unit 34 without departing from the spirit or scope of the present disclosure.

Moreover, the system 10 comprises a controller 36 in communication with the cleaning unit 24, the steam furnace 30, and the cooling unit 34. The controller 36 is configured to control the cleaning unit 24, the steam furnace 30, and the cooling unit 34. Furthermore, the system 10 comprises a power source 38 configured to power the cleaning unit 24, the steam furnace 30, the cooling unit 34, and the controller 36.

In one embodiment, the units of the system 10 may be arranged to be in manufacturing communication with each other. For example, the units may be in communication by way of a moving conveyor 40 such that the brake rotor 12 may be disposed on the conveyor 40 in the cleaning unit 24 by the robotic unit. After cleaning, the brake rotor 12 may be moved from the cleaning unit 24 to the furnace 30 by way of the conveyor 40. After heating, the brake rotor 12 may be moved from the furnace 30 to the cooling unit 34 by way of the conveyor 40 (or the robotic unit). After cooling, brake rotor 12 may be moved from the cooling unit 34 to a machining area or an inspection area by way of the robotic unit (or manually by hand).

Upon cooling, the brake rotor 12 may be moved from the cooling area for machining and inspection by the robotic unit. It is understood that the brake rotor 12 may be moved by any other suitable manner, e.g., manually or by hand, without departing from the scope or spirit of the present disclosure.

FIG. 5 depicts a method 110 of making an enhanced vehicular brake rotor having improved wear and corrosion resistance by way of the system 10 of FIG. 1 in accordance with one example of the present disclosure. As shown, the method 110 comprises in box 112 providing a vehicular brake rotor 12 comprising a base (or disc portion) 14 having a first side 16 and an opposing second side 18 (not shown) comprised of iron (Fe). A core is coaxially rotatably attached to the base 14 for connection to a wheel hub (not shown). As discussed, FIG. 3 depicts a magnification of the base 14 in microns. As shown, the base 14 comprises an outer surface 20 having open pores 22 formed thereon. As pores have been known to become local corrosion initiation sites, implementation of the systems and methods herein provide corrosion prevention and resistance.

Referring to FIG. 5, the method 110 further comprises in box 114 cleaning the brake rotor 12 to remove contamination therefrom. In this example, the step of cleaning may be accomplished by the cleaning unit 24 (FIG. 1) which is arranged to clean the brake rotor 12 to remove contamination thereon. That is, the brake rotor 12 is cleaned such that contamination (oils, debris, residue) thereon is prevented or minimized.

In one example, the step of cleaning may comprise applying a solvent on the brake rotor 12 to remove contamination therefrom. It is to be understood that any suitable solvent may be used to clean the brake rotor 12 such as a plasma or any solvent known in the art without departing from the spirit or scope of the present disclosure. Moreover, the step of cleaning comprises drying the brake rotor 12 after applying solvent thereon. It is to be understood that any suitable drying method may be used without departing from the spirit or scope of the present disclosure.

Moreover, the method 110 comprises in box 116 heating (by way of steam treatment) the brake rotor 12 with gaseous steam to a temperature of between 600 degrees Fahrenheit (° F.) and 1000° F. for between 0.5 hour (hr) and 3 hr to form a steam-treated layer 32 on the outer surface 20 and in the open pores 22. In this example, the step of heating may be accomplished by the steam furnace 30 (FIG. 1) of the system 10.

In one embodiment, the brake rotor 12 may be heated to a temperature of between 700° F. and 900° F. in the steam furnace 30. More preferably, the brake rotor 12 may be heated to 800° F. Moreover, the time to heat the brake rotor 12 in the steam furnace 30 may be between 1 hr and 2 hr, preferably 1.5 hr.

As discussed above, steam treatment of the brake rotor creates an iron oxide layer 32 on the outer surface 20 thereof. Steam treatment provides the outer surface 20 with increased corrosion resistance, hardness, density and magnetic properties. Additionally, steam treatment can also be used to seal the open pores 22 of the outer surface 20 and improve wear characteristic of the outer surface 20. Steam treatment is preferably a batch process. As steam is introduced in the steam furnace 30, water vapor reacts with the iron of the outer surface 20 to form the steam-treated layer 32 comprised of iron oxide or magnetite ($Fe_3O_4$). After a designated period of time, the brake rotor 12 is removed from the steam furnace 30 and allowed to cool as discussed below.

In another embodiment for efficiency and throughput, a preferred steam treat process may utilize a continuous belt steam-treat furnace having temperature ranging between 600° F. and 700° F. Throughput may depend on the thickness of the iron oxide layer 32 as desired and may range from a time of 0.5 hr to 3 hr. It is to be understood that other temperature and time ranges may be used without departing from the spirit or scope of the present disclosure.

As a result, the steam-treated layer 32 is formed on the outer surface 20 and is comprised of iron oxide ($Fe_3O_4$) or magnetite. Preferably, the steam-treated layer 32 has a thickness of between 10 and 50 microns for enhanced wear and corrosion resistance. In another example, the thickness of the steam-treated layer 32 is between 20 microns and 30 microns. More preferably, the thickness of the steam-treated layer 32 is 25 microns.

As shown, the steam-treated layer 32 is formed on the outer surface 20 and in the open pores 22 to prevent or minimize moisture that would otherwise form thereon. Thus, the steam-treated layer 32 helps to seal the outer surface 20 and open pores 22, providing enhanced wear and corrosion resistance to the brake rotor.

Furthermore, the method 110 comprises in box 118 cooling the brake rotor 12 to ambient temperature, defining the enhanced vehicular brake rotor. Preferably, the step of cooling is accomplished by the cooling unit 34 of FIG. 1. It is to be understood that the cooling unit 34 may be any designated unit or area arranged to allow the brake rotor 12 to cool to ambient temperature. For example, the brake rotor 12 may manually or robotically be disposed in a cooling bin after steam heating. After cooling, the brake rotor 12 may be moved to another area or unit for machining and/or inspection.

With the system 10 of FIG. 1 implementing the method 110 of FIG. 5, an enhanced vehicular brake rotor having improved wear and corrosion resistance is provided. As discussed above, the enhanced vehicular brake rotor comprises a brake rotor comprising a base 14 comprised of iron (Fe). The base 14 comprises an outer surface 20 having open pores 22 formed thereon. The brake rotor has a steam-treated layer 32 formed on the outer surface 20 and in the open pores 22. The steam-treated layer 32 is comprised of iron oxide ($Fe_3O_4$) and has a thickness of between 10 and 50 microns for enhanced wear and corrosion resistance to define the enhanced vehicular brake rotor.

Preferably, the thickness of the steam-treated layer 32 is between 20 microns and 30 microns. More preferably, the thickness of the steam-treated layer 32 is 25 microns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of making an enhanced vehicular brake rotor having improved wear and corrosion resistance, the method comprising:
   providing a vehicular brake rotor comprising a disc portion having a first side and an opposing second side and comprised of iron (Fe), the disc portion comprising an outer surface having open pores formed thereon;
   cleaning the brake rotor to remove contamination thereon;
   heating the brake rotor with gaseous steam to a temperature of between 315 degrees Celsius (° C.) and 540° C. for between 0.5 hour (hr) and 3 hr to define a steam-treated layer formed on the outer surface and in the open pores, the steam-treated layer being comprised of iron oxide ($Fe_3O_4$) and having a thickness of between 10 and 50 microns for enhanced wear and corrosion resistance; and cooling the enhanced vehicular brake rotor to ambient temperature, defining the enhanced vehicular brake rotor.

2. The method of claim 1 wherein the temperature of the brake rotor is between 700° F. and 900° F.

3. The method of claim 1 wherein the temperature of the brake rotor is 800° F.

4. The method of claim 1 wherein a time to heat the brake rotor is between 1 hr and 2 hr.

5. The method of claim 1 wherein a time to heat the brake rotor is 1.5 hr.

6. The method of claim 1 wherein the thickness of the steam-treated layer is between 20 microns and 30 microns.

7. The method of claim 1 wherein the thickness of the steam-treated layer is 25 microns.

8. The method of claim 1 wherein the step of cleaning comprises applying a solvent on the brake rotor to remove contamination therefrom and drying the brake rotor after applying solvent thereon.

\* \* \* \* \*